United States Patent [19]

Matsuda et al.

[11] Patent Number: 4,587,287

[45] Date of Patent: May 6, 1986

[54] COATING COMPOSITION

[75] Inventors: Koichi Matsuda; Shohei Tamaki; Hiroshi Harada; Masami Nakashima; Makoto Fujiyoshi, all of Omuta, Japan

[73] Assignee: Denki Kagaku Kogyo Kabushiki Kaisha, Tokyo, Japan

[21] Appl. No.: 685,835

[22] Filed: Dec. 24, 1984

[51] Int. Cl.$^4$ ................................................. C08K 3/38
[52] U.S. Cl. ...................................... 524/404; 524/588
[58] Field of Search ........................................... 524/404

[56] References Cited

U.S. PATENT DOCUMENTS 3,293,203 12/1966 Paulus ................................. 524/404

FOREIGN PATENT DOCUMENTS 54-61253 5/1979 Japan .................................... 524/404
56-106956 8/1981 Japan .................................... 524/404
58-225167 12/1983 Japan .................................... 524/404

Primary Examiner—Lewis T. Jacobs
Attorney, Agent, or Firm—Oblon, Fisher, Spivak, McClelland & Maier

[57] ABSTRACT

A coating composition comprising from 20 to 60 parts by weight of component (A) of a powder composition composed essentially of from 30 to 80% by weight of boron nitride, from 1 to 18% by weight of a low melting point glaze, the rest being an inorganic pigment, and from 40 to 80 parts by weight of component (B) of a liquid composition composed essentially of from 20 to 60% by weight of a silicone resin, the rest being an organic solvent in which the silicone resin is dissolved.

6 Claims, No Drawings

COATING COMPOSITION

BACKGROUND OF THE INVENTION

1. Field of the Invention

The present invention relates to a coating composition, and particularly to a coating composition which is composed of a silicone resin solution containing boron nitride, a glaze and an inorganic pigment in certain specific proportions and which has excellent adhesion, lubrication and release properties.

2. Description of the Prior Art

Boron nitride (BN) exhibits excellent electric insulation and heat conduction properties even at a high temperature and yet its thermal expansion coefficient is small. Thus, it is durable against heat shock, and is hardly wetted or eroded by molten metal, molten salt or molten glass. Accordingly, it is useful, for instance, as a releasing agent for glass molding or die casting.

As a method for using it as a releasing agent, there may be mentioned (1) a method wherein a BN shaped product or powder is used by itself, or (2) a method wherein a solution obtained by dispersing a BN powder in water, an oil or a solvent, optionally with an addition of a binder, is coated on a substrate, followed by baking. However, the BN shaped product in the method (1) is so expensive that the use of such a shaped product is not practical. Whereas, when a BN powder is directly coated on the substrate, its adhesion will be poor, and it is impossible to obtain a coating film with good quality. On the other hand, when a solution obtained by dispersing the BN powder according to the method (2) is baked onto the substrate at a high temperature of a level of about 700° C., peeling or cracking is likely to result in the coating film. Therefore, such a solution is hardly useful as a mold releasing agent for molding glass at a temperature of about 700° C. Even when the baking is conducted at a temperature lower than 700° C., the temperature raising or cooling operations are required to be conducted under mild conditions. Otherwise, cracks or blisters are likely to result. Thus, the method (2) has a drawback that the baking operation is time consuming.

SUMMARY OF THE INVENTION

It is an object of the present invention to solve the above-mentioned drawbacks, and to provide a coating composition which, when applied to a substrate, exhibits excellent adhesion, lubrication and release properties and yet is free from peeling, cracking or blistering even when baked under rapid heating or cooling conditions.

Namely, the present invention provides a coating composition comprising from 20 to 60 parts by weight of component (A) of a powder composition composed essentially of from 30 to 80% by weight of boron nitride, from 1 to 18% by weight of a low melting point glaze, the rest being an inorganic pigment, and from 40 to 80 parts by weight of component (B) of a liquid composition composed essentially of from 20 to 60% by weight of a silicone resin, the rest being an organic solvent in which the silicone resin is dissolved.

DETAILED DESCRIPTION OF THE INVENTION

Now, the present invention will be described in detail with reference to the preferred embodiments.

The present invention is a coating composition comprising boron nitride, a low melting point glaze, an inorganic pigment, a silicone resin and a solvent for the silicone resin. When the coating composition is coated on a substrate and baked, a uniform coating film intimately bonded to the substrate will be formed and will be capable of being used repeatedly as a high temperature releasing material.

Firstly, components (A) and (B) of the composition of the present invention will be described.

The component (A) is a powder composition, whereas the component (B) is a liquid composition. The components (A) and (B) are so divided merely for the convenience of the classification based on the mixing operation. Therefore, the composition of the present invention is not restricted to the particular division of the components, and any coating composition comprising the components (A) and (B) in the specified proportions, falls within the scope of the present invention.

The coating composition of the present invention is a mixture comprising from 20 to 60 parts by weight of component (A) of a powder composition which is composed essentially of from 30 to 80% of BN, from 1 to 18% by weight of a low melting point glaze, the rest being an inorganic pigment, and from 40 to 80 parts by weight of component (B) of a liquid composition which is composed essentially of from 20 to 60% by weight of a silicone resin, the rest being an organic solvent in which the silicone resin is dissolved.

The coating composition of the present invention is useful as a coating composition for e.g. a heat-resistant electric wire, a corrosion resistant releasing material for molten metal, a casting mold or a measuring device such as a leveling meter or thermometer which is used in contact with molten metal or alloy.

Now, the component (A) of a powder composition will be described first.

The BN powder is present in an amount of from 30 to 80% by weight in the component (A). If the BN powder exceeds 80% by weight, the adhesion to the substrate tends to decrease, whereby peeling or cracking is likely to be led. On the other hand, if the BN powder is less than 30% by weight, the lubrication property, the release property, the insulation property, the heat resistance or a corrosion resistance tends to be poor. The BN powder serves to impart a lubrication property, a release property, an insulation property, a heat resistance or the corrosion resistance to the coating film. If the BN purity is low, such desirable properties will be impaired by the impurities. Thus, the purity is preferably at least 90%. Further, the particle size affects the adhesion to the substrate to a large extent, and is preferably at most 10 $\mu$m.

Next, the low melting point glaze is present in an amount of from 1 to 18% by weight in the component (A). If the glaze exceeds 18% by weight, the lubrication property, the release property, the flexibility or the heat resistance tends to be poor. On the other hand, if the glaze is less than 1% by weight, the adhesion to the substrate tends to be poor, whereby peeling or cracking of the coating film is likely to be led.

In the present invention, the low melting point glaze is a glaze having a melting point of from 300° to 700° C. The reason for the incorporation of a glaze having such a melting point is that when the coating composition of the present invention is coated on a substrate and baked whereby the coating film softens at a temperature around 400° C. where the adhesion of the coating film to the substrate decreases, the glaze reacts with $SiO_2$ formed by the thermal decomposition of the silicone resin, to form a stable substance and to establish firm adhesion to the substrate. Further, at a high temperature of from 700° to 900° C., it reacts with the inorganic pigment to form a stable substance and to enhance the adhesion to the substrate.

The inorganic pigment constitutes the rest of the component (A) other than the BN and low melting point glaze. Namely, the inorganic pigment is present in an amount of from 2 to 69% by weight in the component (A). If the inorganic pigment exceeds 69% by weight, the lubrication property or the release property of the coating film tends to decrease, and if the amount is less than 2% by weight, peeling or cracking of the coating film is likely to result.

As the inorganic pigment, there may be employed a commercially available white pigment such as titanium oxide ($TiO_2$), aluminum oxide ($Al_2O_3$) or barium sulfate ($BaSO_4$), or a black pigment such as iron oxide ($Fe_3O_4$). The particle size is preferably at most 10 μm in view of the reactivity with the glaze and the adhesion to the substrate. Further, the inorganic pigment preferably has a melting point slightly higher than the melting point of the glaze. The pigment reacts with $SiO_2$ formed by the thermal decomposition of the silicone resin, or with the glaze, to from a stable substance, and thereby to prevent the peeling or cracking of the coating film which is otherwise likely to take place during the baking operation or during the rapid heating or cooling, and thus serves to form a coating film having high adhesion strength.

Now, the component (B) will be described. The component (B) is a liquid composition comprising a silicone resin and an organic solvent in which the silicone resin is dissolved.

The silicone resin is present in an amount of from 20 to 60% by weight in the component (B). If the silicone resin exceeds 60% by weight, the amount of the gas generated during the thermal decomposition tends to increase, whereby blisters are likely to form in the coating film. On the other hand, if the amount is less than 20% by weight, the low temperature adhesion to the substrate tends to be poor, and at the same time, the amount of $SiO_2$ generated at a high temperature tends to be small, whereby the adhesion to the substrate will be poor. As the silicone resin, there may be employed a commercial product. For instance, it is possible to employ a liquid type comprising an organic solvent in which a silicone resin is dissolved. It is further possible to employ a modified silicone resin prepared by mixing such a liquid type silicone resin with an alkyl resin, an acryl resin, a phenol resin or an epoxy resin, by itself, since such a modified silicone resin contains an organic solvent. The viscosity of the silicone resin is advantageously from 1000 to 5000 cps. The silicone resin serves to improve the adhesion to the substrate within a temperature range of from room temperature to 300° C., and further functions as a binder for the powder composition. Furthermore, at a high temperature, $SiO_2$ generated by the thermal decomposition, will react with the glaze or the inorganic pigment to form a stable substance and thereby to enhance the adhesion with the substrate.

The solvent is present in an amount of from 40 to 80% by weight in the component (B). If the solvent exceeds 80% by weight, the relative amount of the silicone resin decreases, whereby the effect for the adhesion tends to be poor. On the other hand, if the amount is less than 40% by weight, the mixing with the powder composition tends to be difficult. Consequently, it will be difficult not only to uniformly disperse the powder composition but also to uniformly coat the obtained dispersion, thus leading to poor operation efficiency. As the solvent, there may be employed any solvent compatible with the silicone resin, such as toluene or xylene. The solvent serves to facilitate the mixing of the components (A) and (B) and to improve the operation efficiency for the coating of the mixture onto the substrate.

The coating composition of the present invention may be readily prepared by mixing the components (A) and (B) in the above-mentioned proportions in a mixer for a few hours.

The coating composition thus prepared, may be used as a releasing agent simply by coating it on a high temperature material such as iron, alumina or graphite by means of a proper coating method such as brush coating or spraying, followed by drying at room temperature. Thus, no special means is required, and the composition may easily be used at the working site. The composition of the present invention may be applied as it is, or after diluting it with a proper solvent.

The product of the present invention does not give rise to any problem even when rapidly heated or cooled, and thus is an excellent coating composition for a high temperature material.

As described in the foregoing, the coating composition of the present invention exhibits strong adhesion to the substrate even when subjected to rapid heating or cooling, and has excellent lubrication and release properties. Thus, the composition is useful as the releasing agent for the glass molding, or for the prevention of the oxidation of graphite. Further, since the coating composition has excellent heat resistance and corrosion resistance, it is useful as a corrosion resistant releasing agent for a casting mold for molten metal or alloy. Furthermore, since the composition of the present invention has excellent heat resistance, electric insulating properties and flexibility, it is useful as a coating composition for electric wires. For this purpose, the composition may be applied as it is, or after diluting it with a solvent, to a heat resistant electric wire material such as a nickel plated wire or a nickel wire. In order to further improve the flexibility, a heat resistant resin such as a polyimide resin, a polyamide imide resin or an ester imide resin, may be coated on the coating layer, followed by baking.

Now, the present invention will be described in further detail with reference to Examples. However, it should be understood that the present invention is by no means restricted by these specific Examples. In the Examples, "%" and "parts" mean "% by weight" and "parts by weight", respectively.

EXAMPLE 1

A powder composition comprising a BN powder (particle size: at most 5 μm), fritted glass (particle size: at most 5 μm, melting point: 500° C.) as a low melting point glaze and iron oxide (particle size: at most 5 μm) as an inorganic pigment, and a liquid composition comprising a silicone resin and toluene as a solvent, were mixed in the proportions identified in each of Test Nos. 1 to 4 in Table 1, and uniformly blended in a ball mill. The mixture was coated with a brush on a substrate made of iron plate, alumina or graphite in a thickness of 1 mm, then dried at room temperature, and baked for 30 minutes in an oven at 700° C., and thereafter immediately cooled to room temperature. Each baking treated substrate was tested for the adhesion of the formed coating film by peeling the coating film with an adhesive tape sticked to the film. Then, each baking treated substrate was immersed in molten glass for 10 minutes, and then taken out to examine the wettability of the coating film with molten glass. The results are shown in Table 2.

COMPARATIVE EXAMPLE 1

The test was conducted in the same manner as in Example 1 except that 40 parts of a powder composition obtained by mixing 10% of a BN powder (particle size: at most 5 μm), 5% of fritted glass (particle size: at most 5 μm, melting point: 500° C.) as a glaze and 85% of iron oxide (particle size: at most 5 μm) as an inorganic pigment, and 60 parts of a liquid composition comprising 40% of a silicone resin and 60% of toluene as a solvent, were used. (Test No. 5)

COMPARATIVE EXAMPLE 2

The test was conducted in the same manner as in Example 1 except that 40 parts of a powder composition obtained by mixing 50% of a BN powder (particle size: at most 5 μm), 5% of fritted glass (particle size: at most 5 μm, melting point: 500° C.) as a glaze and 45% of iron oxide (particle size: at most 5 m) as an inorganic pigment, and 60 parts of a liquid composition comprising 5% of a silicone resin and 95% of toluene as a solvent, were used. (Test No. 6)

EXAMPLE 2

The test was conducted in the same manner as in Example 1 except that titanium oxide was used instead of the iron oxide in Test No. 1. (Test No. 7)

TABLE 1

| Test No. | Powder composition | | | | Liquid composition | | |
|---|---|---|---|---|---|---|---|
| | BN (%) | Glaze (%) | Pigment (%) | Total (parts) | Silicone (%) | Solvent (%) | Total (parts) |
| 1 | 50 | 5 | 45 | 40 | 40 | 60 | 60 |
| 2 | 30 | 1 | 69 | 20 | 60 | 40 | 80 |
| 3 | 80 | 18 | 2 | 60 | 20 | 80 | 40 |
| 4 | 50 | 10 | 40 | 30 | 30 | 70 | 70 |
| 5 (Comparative) | 10 | 5 | 85 | 40 | 40 | 60 | 60 |
| 6 (Comparative) | 50 | 5 | 45 | 40 | 5 | 95 | 60 |
| 7 | 50 | 5 | 45 | 40 | 40 | 60 | 60 |

TABLE 2

| Test No. | Substrate | Adhesion to the substrate | Wettability to glass |
|---|---|---|---|
| 1 | A | O | O |
| | B | O | O |
| | C | O | O |
| 2 | A | O | O |
| | B | O | O |
| | C | O | O |
| 3 | A | O | O |
| | B | O | O |
| | C | O | O |
| 4 | A | O | O |
| | B | O | O |
| | C | O | O |
| 5 (Comparative) | A | O | X |
| | B | O | X |
| | C | O | X |
| 6 | A | X | Impossible to |
| (Comparative) 7 | B | X | form a coating film |
| | C | X | |
| | A | O | O |
| | B | O | O |
| | C | O | O |

Note 1:
A: iron plate substrate,
B: alumina substrate, and
C: graphite substrate.

Note 2:
The physical properties in Table 2 were evaluated by a visual observation in accordance with the following evaluation standards:
(1) Evaluation of the adhesion to the substrate
O: No abnormality was observed in the coating film.
X: Peeling or cracking was observed in the coating film.
(2) Evaluation of the wettability with molten glass
O: No wettability with molten glass was observed.
X: Wettability with molten glass was observed.

EXAMPLE 3

A powder composition comprising a BN powder (particle size: at most 5 μm), fritted glass (particle size: at most 5 μm, melting point: 500° C.) as a low melting point glaze and iron oxide (particle size: at most 5 μm) as an inorganic pigment, and a liquid composition comprising a silicone resin and toluene as a solvent, were mixed in the proportions identified in each of Test Nos. 8 to 11 in Table 3 and uniformly blended in a ball mill. The mixture thereby obtained was baked onto a nickel-plated wire (nickel layer thickness: 2 μm) having a diameter of 1.0 mm by means of a horizontal baking oven having an oven length of 7.5 mm, 7 times at a wire speed of 8 m/min at a temperature of 500° C., 600° C. or 700° C., whereby a heat resistant insulating electric wire was obtained.

The physical properties of the heat resistant insulating electric wires thus obtained are shown in Table 3. (Test Nos. 8 to 11)

EXAMPLE 4

The test was conducted in the same manner as in Example 3 except that aluminum oxide ($Al_2O_3$) was used instead of the iron oxide. (Test No. 12)

COMPARATIVE EXAMPLE 3

The test was conducted in the same manner as in Example 3 except that 40 parts of a powder composition obtained by mixing 10% of a BN powder (particle size: at most 5 μm), 5% of fritted glass (particle size: at most 5 μm, melting point: 500° C.) as a glaze and 85% of iron oxide (particle size: at most 5 μm) as an inorganic pigment, and 60 parts of a liquid composition comprising 40% of a silicone resin and 60% of toluene as a solvent, were used. (Test No. 13)

COMPARATIVE EXAMPLE 4

The test was conducted in the same manner as in Example 3 except that 40 parts of a powder composition obtained by mixing 50% of a BN powder (particle size: at most 5 μm), 5% of fritted glass (particle size: at most 5 μm, melting point: 500° C.) as a glaze and 45% of iron oxide (particle size: at most 5 μm) as an inorganic pigment, and 60 parts of a liquid composition comprising 5% of a silicone resin and 95% of toluene as a solvent, were used. (Test No. 14)

COMPARATIVE EXAMPLE 5

The test was conducted in the same manner as in Example 3 except that an inorganic polymer coating material (coating material "SMP" (trade name) manufactured by Showa Electric Wire & Cable Co. Ltd.) containing a polyborosiloxane resin was used as a coating material for the electric wire. (Test No. 15)

It is evident from Table 3 that the coating compositions for electric wires according to the present invention are superior to the conventional inorganic polymer heat resistant coating composition containing a polyborosiloxane resin in the heat resistance and electric insulation properties, and thus useful as coating materials for heat resistant electric wires for which heat resistance at a temperature of 500° C. or higher is required.

runs. Further, the release properties were found to be satisfactory.

COMPARATIVE EXAMPLE 6

The test was conducted in the same manner as in Example 5 except that a corrosion resistant releasing agent comprising 40% of $TiO_2$ (particle size: at most 5 $\mu$m), 20% of kaolinite as a binder and 40% of a boiled oil (linseed oil) as a dispersing medium, was employed, whereby the corrosion resistance was found to be 7,000 runs. The release properties were not satisfactory. Thus, the corrosion resistant releasing agent according to the present invention is superior to the conventional releasing agent in the corrosion resistance and the release properties, and is effective to prolong the useful life of the coating film to a large extent. The physical properties of the coating films were measured as follows.

TABLE 3

| | Proportions of feed materials | | | | | | | Physical properties | | | | |
|---|---|---|---|---|---|---|---|---|---|---|---|---|
| | Powder composition | | | | Liquid composition | | | Coating film thick- ness($\mu$m) | Flexi- bility (d) | Dielectric Break- down voltage (KV) | Heat shock resistance (d) Baking temperature | | |
| Test No. | BN (%) | Glaze (%) | Pig- ment (%) | Total (parts) | Sili- cone resin (%) | Sol- vent (%) | Total (parts) | | | | 500° C. × 1 hr | 600° C. × 1 hr | 700° C. × 1 hr |
| | | | | | | | | Baking temp.: 500° C. | | | | | |
| 8 | 50 | 5 | 45 | 40 | 40 | 60 | 60 | 27 | 1 | 3 | 1 | 2 | 5 |
| 9 | 30 | 1 | 69 | 20 | 60 | 40 | 80 | 28 | 2 | 1 | 2 | 4 | 6 |
| 10 | 80 | 18 | 2 | 60 | 20 | 80 | 40 | 27 | 3 | 2 | 3 | 4 | 6 |
| 11 | 50 | 10 | 40 | 30 | 30 | 70 | 70 | 27 | 1 | 2 | 1 | 2 | 5 |
| 12 | 50 | 5 | 45 | 40 | 40 | 60 | 60 | 28 | 1 | 3 | 1 | 2 | 5 |
| 13 (Comparative) | 10 | 5 | 85 | 40 | 40 | 60 | 60 | 27 | 16 | 0.5 | 16 | 18 | 20 |
| 14 (Comparative) | 50 | 5 | 45 | 40 | 5 | 95 | 60 | 27 | 18 | 0.5 | 18 | 20 | 30 |
| 15 (Comparative) | Polyborosiloxane resin | | | | | | | 27 | 12 | 0.5 | 12 | 12 | 50< |

The physical properties presented in Table 3 were measured in accordance with the following methods.

(1) Coating film thickness:
Measured by a micrometer manufactured by Mitoyo K.K. (unit: $\mu$m)

(2) Flexibility:
In accordance with JIS C-3003 8.1.1(2) (unit: diameter d for proper winding)

(3) Dielectric breakdown voltage:
In accordance with JIS C-3003 11.1 (unit: KV)

(4) Heat shock resistance:
In accordance with JIS C-3003 14.1(2) (unit: diameter d for proper winding)

EXAMPLE 5

40 parts of a powder composition comprising 50% of a BN powder (particle size: at most 5 $\mu$m), 5% of fritted glass (particle size: at most 5 $\mu$m, melting point: 500° C.) as a low melting point glaze and 45% of $BaSO_4$ (particle size: at most 5 $\mu$m) as an inorganic pigment, and 60 parts of a liquid composition comprising 40% of a silicone resin and 60% of toluene has a solvent, were mixed and uniformly blended in a ball mill. The mixture was sprayed to a cast iron crucible for an aluminum die casting machine having an internal capacity of 2 liters, in a thickness of 1 mm, and dried at 200° C. for 1 hour. The crucible thus treated, was mounted on the die casting machine, and used for repeated casting of an aluminum alloy (ADC12) molten at a temperature of 700° C. The corrosion resistance was found to be at least 70,000

(1) Corrosion resistance:
Represented by a number of casting times (runs) until the coating film of the cast iron crucible was eroded by molten aluminum.

(2) Release properties:
The easiness for the peeling of aluminum deposited on the cast iron crucible was visually observed and evaluated.

EXAMPLE 6

40 parts of a powder composition comprising 50% of a BN powder (particle size: at most 5 $\mu$m), 5% of fritted glass (particle size: at most 5 $\mu$m, melting point: 500° C.) as a low melting point glaze and 45% of $BaSO_4$ (particle size: at most 5 $\mu$m) as an inorganic pigment, and 60 parts of a liquid composition comprising 40% of a silicone resin and 60% of toluene as a solvent, were mixed and uniformly blended in a ball mill. The mixture was sprayed onto the surface of a cast iron mold (SKD-6) having a capacity of 3 liters, to form a coating layer having a thickness of 1 mm, and dried at a temperature of 200° C. for 1 hour. Then, into this mold, an aluminum alloy (AC4C) molten at a temperature of from 700° to 780° C. was introduced and cast under natural gravity. The casting was satisfactorily repeated 50 times. The release properties were satisfactory. The corrosion resistance and release properties were evaluated in accordance with the following evaluation standard. Evaluation standard:

The surface condition of the product taken out from the mold was examined. And the evaluation was represented by the number of casting times until galling appeared.

COMPARATIVE EXAMPLE 7

The test was conducted in the same manner as in Example 6 except that a commercially available coating composition for a mold i.e. a coating composition obtained by dispersing graphite powder in water, was employed, whereby the number of casting times was 12 times.

EXAMPLE 7

18% of a BN powder (particle size: at most 5 μm), 2% of a glaze (fritted glass having a particle size of at most 5 μm and a melting point of 500° C.) and 20% of an inorganic pigment (BaSO$_4$ having a particle size of at most 5 μm), as a powder composition, and 26% of a silicone resin and 34% of toluene, as a liquid composition, were uniformly mixed in a ball mill. The mixture was sprayed to a temperature measuring device made of cast iron and having an outer diameter of 40 mm, an inner diameter of 15 mm and a length of 1000 mm, to form a coating layer having a thickness of 1 mm, and dried at 200° C. for 1 hour. Then, the coated measuring device was immersed continuously in molten aluminum at 700° C., whereby the corrosion resistance was at least 50 days. Further, the release properties were satisfactory.

COMPARATIVE EXAMPLE 8

The test was conducted in the same manner as in Example 7 except that a coating composition for a measuring device comprising 30% of TiO$_2$ (particle size: at most 5 μm), 20% of kaolinite as a binder and 50% of a boiled oil (linseed oil) as a dispersing medium, was used, whereby the corrosion resistance was 5 days. Further, the release properties were not satisfactory.

Thus, it is evident that the coating composition for a measuring device according to the present invention provides a coating film which has a substantially longer effective life than the coating film obtained by the conventional coating agent and which is superior in the corrosion resistance, the heat resistance and the release properties, and thus is useful as a coating material for the protection of a measuring device.

The physical properties of the coating films were measured as follows.

(1) Corrosion resistance:

Represented by the number of days until the coating film of the cast iron temperature measuring device was eroded by molten aluminum.

(2) Release properties:

The easiness for the peeling of aluminum deposited on the cast iron temperature measuring device, was visually observed and evaluated.

What is claimed is:

1. A coating composition comprising from 20 to 60 parts by weight of component (A) of a powder composition composed essentially of from 30 to 80% by weight of boron nitride, from 1 to 18% by weight of a low melting point glaze, the rest being an inorganic pigment, and from 40 to 80 parts by weight of component (B) of a liquid composition composed essentially of from 20 to 60% by weight of a silicone resin, the rest being an organic solvent in which the silicone resin is dissolved.

2. The coating composition according to claim 1, wherein the low melting point glaze is a glaze having a melting point of from 300° to 700° C.

3. The coating composition according to claim 1, wherein the inorganic pigment is titanium oxide, aluminum oxide, barium sulfate or iron oxide.

4. The coating composition according to claim 1, wherein the solvent is toluene or xylene.

5. The coating composition according to claim 1, wherein the low melting point glaze is fritted glass.

6. The coating composition according to claim 1, wherein the boron nitride is a BN powder having a particle size of at most 10 μm and a purity of at least 90%.

* * * * *